United States Patent

Ardelean et al.

(10) Patent No.: US 7,156,905 B2
(45) Date of Patent: Jan. 2, 2007

(54) COMPOSITION AND METHOD FOR TREATING MAGNESIUM ALLOYS

(75) Inventors: Hélène Ardelean, Palaiseau (FR); Philippe Marcus, Paris (FR)

(73) Assignee: Universite Pierre & Marie Curie, Paris (FR)

( * ) Notice: Subject to any disclaimer, the term of this patent is extended or adjusted under 35 U.S.C. 154(b) by 207 days.

(21) Appl. No.: 10/478,861

(22) PCT Filed: May 31, 2002

(86) PCT No.: PCT/FR02/01843

§ 371 (c)(1), (2), (4) Date: Nov. 25, 2003

(87) PCT Pub. No.: WO02/097164

PCT Pub. Date: Dec. 5, 2002

(65) Prior Publication Data

US 2004/0217330 A1    Nov. 4, 2004

(30) Foreign Application Priority Data

May 31, 2001  (FR) .................................. 01 07173

(51) Int. Cl.
*C23C 22/57* (2006.01)
*C23F 11/18* (2006.01)

(52) U.S. Cl. ................. 106/14.21; 106/14.11; 148/247; 427/435; 428/469; 428/471; 428/472; 428/472.1

(58) Field of Classification Search ............. 106/14.11, 106/14.21; 427/435; 428/469, 471, 472, 428/472.1; 148/247
See application file for complete search history.

(56) References Cited

U.S. PATENT DOCUMENTS

| 3,066,055 A | 11/1962 | Pimbley |
| 5,260,357 A * | 11/1993 | Sachdeva .................... 523/414 |
| 5,584,944 A | 12/1996 | Bershas et al. |
| 2005/0072685 A1* | 4/2005 | Ardelean et al. ........... 205/318 |

FOREIGN PATENT DOCUMENTS

| DE | 707722 | 7/1941 |
| EP | 0969078 A2 | 1/2000 |
| WO | 99/60186 A | 11/1999 |

* cited by examiner

*Primary Examiner*—Anthony J. Green
(74) *Attorney, Agent, or Firm*—Buchanan, Ingersoll & Rooney

(57) ABSTRACT

The invention relates to a composition and method for treating a magnesium alloy. The inventive composition comprises an acid aqueous solution containing niobium pentoxide, a water-soluble cerium salt and, optionally, a zirconium salt and/or hydroflouric acid. Said method consists in submerging a magnesium alloy part in said composition. The invention can be used to protect magnesium alloy parts against corrosion.

36 Claims, No Drawings

COMPOSITION AND METHOD FOR TREATING MAGNESIUM ALLOYS

BACKGROUND OF THE INVENTION

1. Field of the Invention

The present invention relates to the treatment of magnesium alloys for the purpose of improving their corrosion resistance.

2. Description of the Related Art

Magnesium alloys are of great benefit because of their lightness. Applications relate especially to the transport (automobile and aeronautical) industries, medical equipment and mobile telephony. One of the weak points of these materials is their sensitivity to corrosion. Corrosion protection can be obtained by depositing a coating on or by treating the surface. The protective coatings may be produced, for example, by chemical conversion or by anodizing in solutions containing salts of metals and metalloids.

The conversion treatments are carried out by immersing the magnesium alloy workpiece to be treated in an oxidizing solution, without applying electrical current. The treatment solutions most commonly used in the industry are solutions of alkali metal chromates or dichromates, which very substantially improve the corrosion resistance of the alloys. However, these treatments have a major drawback insofar as they involve solutions of not insignificant toxicity, because of the presence of $Cr^{VI}$.

It has therefore been endeavored to replace chromate or dichromate solutions with less toxic solutions. For example, a cerium nitrate solution has been used to treat pure magnesium workpieces (H. Ardelean, et al. Proceedings of the 38th Annual Conference of Metallurgists, Symposium on "Environmental Degradation of Materials and Corrosion Control in Metals", Canada, (1999), Met. Soc., published by M. Elboudjdaini and E. Ghali, 1999, pp. 85–103). Using this treatment, a film containing cerium oxide forms on the surface of the magnesium, with the result that the cathode reaction is inhibited and anodic dissolution is reduced.

It is also known that treatment by a cerium salt solution improves the corrosion resistance of stainless steels (Y. C. Lu, et al., Corrosion Science, Vol. 37, No. 1, pp. 145–155, 1995) and of aluminum and its alloys (A. J. Davenport, et al., Corrosion Science, Vol. 32, No. 5/6, pp. 653–663, 1991). It is also known that the immersion of a $CuMgAl_2$ intermetallic compound in a $Ce(NO_3)_3$ solution causes the formation of an Al/Ce oxide precipitate (J. D. Gorman, et al., Corrosion Science, Vol. 38, No. 11, pp. 1977–1990, 1996). It is also known to treat an aluminum alloy containing magnesium with an aqueous cerium chloride solution that furthermore includes hydrogen peroxide (A. E. Hughes, et al., Vol. 23, 540–550 (1995). However, the protective coatings obtained have a few drawbacks insofar as they are porous and that their adhesion is insufficient.

SUMMARY OF THE INVENTION

The inventors have found that, surprisingly, the addition of niobium pentoxide to a cerium nitrate solution makes it possible to obtain a protective and adherent coating on the surface of a workpiece made of a magnesium alloy, without the use of toxic species.

This is why the subject of the present invention is a composition for the treatment of magnesium alloys, a process for treating magnesium alloys, and the protective coatings obtained.

A composition according to the invention for the treatment of a magnesium alloy is an aqueous acid solution containing niobium pentoxide, a water-soluble cerium salt and optionally a zirconium salt. For the purpose of improving the solubility of niobium pentoxide, the composition advantageously contains hydrofluoric acid.

DETAILED DESCRIPTION OF THE EMBODIMENTS

In one particular embodiment, a composition according to the invention for the treatment of a magnesium alloy has a pH of between 3.2 and 4, preferably between 3.3 and 4, and it contains from 0.02 to 0.05 mol/l of niobium pentoxide, from 1 to 2.5 ml/l of hydrofluoric acid, from 0 to 0.1 mol/l of a zirconium salt and from 0.03 to 0.1 mol/l of a water-soluble cerium salt.

Cerium nitrate $Ce(NO_3)_3 \cdot 6H_2O$ is particularly preferred as cerium salt. The incorporation of nitrate ions into the composition causes no deterioration in the corrosion behavior, unlike chloride or sulphate ions that impair the corrosion resistance. Furthermore, the introduction of other anions may cause complexation and/or precipitation problems.

The treatment composition preferably also contains a zirconium salt. For the same reasons as above, $ZrO(NO_3)_2 \cdot xH_2O$ is particularly useful as zirconium salt. When the treatment composition contains a zirconium salt, its concentration is preferably substantially equal to the concentration of cerium salt.

It is preferable for the treatment composition to be supersaturated with niobium pentoxide. Niobium pentoxide forms with hydrofluoric acid fluoroniobate (fluoroniobyl) complexes that decompose the water with evolution of hydrogen, by being oxidized on the cathode sites on the surface. The magnesium ions formed on the anode sites react with the niobium complexes or complexes of other intermediate species to form, on the surface of the magnesium alloy, a mixture of compounds comprising niobium oxide, cerium oxide, magnesium oxide, optionally zirconium oxide, optionally aluminum oxide and optionally other species, for example fluorides.

A treatment composition according to the invention may furthermore contain other constituents, especially compounds used to adjust the pH to the required value. Among these compounds, $NH_4F$ is particularly preferred. The composition may furthermore contain corrosion moderators such as $Al(OH)_3$ and $AlF_3$. It should be noted that $NH_4F$ also acts as a corrosion moderator.

A composition according to the invention for the treatment of a workpiece made of a magnesium alloy may be obtained by introducing, with stirring, into an aqueous $Nb_2O_5$ solution containing HF, the other constituents of the treatment composition, the amounts of the respective constituents being chosen so as to obtain the desired final concentrations, the mixture being stirred and then left to rest for a sufficient time (generally 24 to 48 hours) so that the constituents are dissolved.

In one particular method of implementation, an aqueous solution of each of the constituents is prepared and then an appropriate volume of each of the solutions is mixed together in order to obtain the desired final concentrations.

In a preferred method of implementation, a first step consists in preparing the following solutions:

an aqueous $Nb_2O_5$ solution containing from 0.15 to 0.45 mol/l of pentoxide and from 15 to 25 ml/l of 48% HF;

an aqueous solution containing from 0.15 to 0.75 mol/l of cerium nitrate and from 0 to 0.75 mol/l of zirconyl nitrate $ZrO(NO_3)_2.xH_2O$; and optionally a solution intended to moderate the action of the treatment composition, containing $Al(OH)_3$ (preferably 0.15 mol/l) and $AlF_3.3H_2O$ (preferably 0.09 mol/l).

A second step of the process for preparing the treatment composition consists in introducing, into a given volume of water, the appropriate amounts of each of the above Nb, Zr and Ce primary salt solutions in the order in which they are mentioned, an appropriate amount of crystallized 97% $NH_4F$ and, optionally, an appropriate amount of a solution of aluminum compounds, in order to obtain the desired treatment composition.

The process according to the invention for the treatment of a workpiece made of a magnesium alloy consists in immersing said workpiece in a treatment composition according to the invention.

Before immersion in the treatment composition of the workpiece to be treated, it is preferable for it to undergo a preliminary treatment for the purpose of cleaning the surface. The preliminary treatment may consist of mechanical cleaning using abrasive SiC disks followed by degreasing in a hot phosphate/carbonate solution followed by pickling in a dilute phosphoric/hydrofluoric acid solution.

While the magnesium alloy workpiece is immersed in the treatment composition, the protective species precipitate and are deposited on the surface of the workpiece. During this step, it is preferable to stir the treatment composition and workpiece and to keep the combination at a temperature between 20 and 30° C. It is particularly advantageous to work at room temperature. The immersion time is between 3 h and 24 h. A time of about 3 hours is in general sufficient. For the purpose of promoting the supply of oxygen to the surface of the workpiece to be treated, it is recommended to extract the workpiece from the composition several times during the treatment.

The coating obtained at the surface of the workpiece of magnesium alloy treated by immersion in a treatment composition of the invention is porous. It is therefore desirable to add to the treatment of the workpieces a second step for the purpose of sealing the pores. This sealing step may be carried out by leaving the workpiece extracted from the solution to rest in the air, and then carrying out a succession of "immersion in the treatment composition/resting in air" cycles followed by annealing at low temperature for a few hours. During "immersion/resting" cycles, the immersion period is a few seconds and the duration of the periods of resting in the air is preferably from 20 to 45 minutes. The annealing is advantageously carried out at a temperature between 75 and 175° C., preferably at 150° C., in oxygen for a few hours.

A magnesium alloy workpiece treated according to the process of the invention has, on its surface, a uniform dense coating comprising a mixture of compounds including niobium oxide, cerium oxide, magnesium oxide, optionally zirconium oxide, optionally aluminum oxide and optionally other species, for example fluorides (magnesium fluoride or a complex fluoride such as, for example, a niobyl fluoride). This coating adheres well to the magnesium alloy substrate. It may be characterized by voltammetry, by impedance spectroscopy and by photoelectron spectroscopy (XPS).

The magnesium alloy workpieces treated according to the process of the invention exhibit, compared with an untreated workpiece, an improved corrosion resistance. This improvement is manifested by a shift in the corrosion potential of about 150–220 mV toward more positive values and a substantial reduction in the anodic dissolution or corrosion currents. The presence of zirconyl nitrate in the treatment composition contributes to a reduction in anodic dissolution and corrosion currents and shifts the corrosion potential by about 150 mV toward more positive values.

To confirm the improvement in corrosion resistance obtained on the magnesium alloy workpieces treated according to the process of the invention, specimens were subjected to voltammetry and to impedance spectroscopy in a corrosive medium (for example in a solution containing 0.5 mol/l of $Na_2SO_4$ under polarization). The curves representing the variation in current as a function of potential in a corrosive medium show a shift in the corrosion potential toward more positive values and a substantial reduction in the corrosion and anodic dissolution currents compared with the untreated alloy. These results are confirmed by impedance spectroscopy, which indicates that our coatings provided better corrosion resistance.

The coatings of mixtures of compounds formed on the magnesium alloy after treatment by the composition of the invention may serve as temporary protective coatings or substrates for a paint.

The present invention will be described in greater detail by means of the following examples, the invention not being limited, however, by these examples.

EXAMPLE 1

Preparation of a Treatment Composition

Aqueous solutions of each of the constituents of the treatment composition were firstly prepared. The concentrations of the various aqueous solutions are given below.

| Solution | Constituent | Concentration |
| --- | --- | --- |
| 1 | $Nb_2O_5$ | 0.45 mol/l |
|   | 48% HF | 25 ml/l |
| 2 | $ZrO(NO_3)_2.xH_2O$ | 0.75 mol/l |
| 3 | $CE(NO_3)_3.6H_2O$ | 0.75 mol/l |

Next, eight volumes of water and one volume of each of the solutions 1 to 3 in the order in which they appear in the table were mixed together, and the mixture was subjected to magnetic stirring for 15 min. The pH was then adjusted to a value of between 3.3 and 3.4 using an appropriate amount of crystalline compound, 97% $NH_4F$.

The concentrations of the various constituents in the final composition thus obtained were the following:

| | |
| --- | --- |
| 48% HF | 2.27 ml/l |
| $Nb_2O_5$ | 0.04 mol/l |
| $ZrO(NO_3)_2.xH_2O$ | 0.068 mol/l |
| $Ce(NO_3)_3.6H_2O$ | 0.068 mol/l |
| $NH_4F$ crystallized (97%) | ≈11.2 g/l (≈0.3 mol/l) |

EXAMPLE 2

Preparation of a Treatment Composition

Aqueous solutions of each of the constituents of the treatment composition were firstly prepared. The concentrations of the various aqueous solutions are given below.

| Solution | Constituent | Concentration | v |
|---|---|---|---|
| 1 | $Nb_2O_5$ | 0.45 mol/l | 1 |
|   | 48% HF | 25 ml/l |   |
| 2a | $ZrO(NO_3)_2.xH_2O$ | 0.75 mol/l | 2 |
|    | $Ce(NO_3)_3.6H_2O$ | 0.75 mol/l |   |
| 3a | $Al(OH)_3$ | 0.15 mol/l | 0.25 |
|    | $AlF_3.3H_2O$ | 0.09 mol/l |   |

Next, eight volumes of water and parts of volume v, as indicated in the above table, of each of solutions 1, 2a and 3a were mixed in the order in which these solutions are mentioned in the table, and the mixture was subjected to magnetic stirring for 15 min. The pH was then adjusted to a value between 3.3 and 3.4 using an appropriate amount of crystallized 97% $NH_4F$.

The concentrations of the various constituents in the final composition thus obtained were the following:

| | |
|---|---|
| 48% HF | 2.25 ml/l |
| $Nb_2O_5$ | 0.04 mol/l |
| $ZrO(NO_3)_2.xH_2O$ | 0.067 mol/l |
| $Ce(NO_3)_3.6H_2O$ | 0.067 mol/l |
| $Al(OH)_3$ | 0.003 mol/l |
| $AlF_3.3H_2O$ | 0.002 mol/l |
| $NH_4F$ (97%) | ≈11.1 g/l (≈0.3 ml) |

EXAMPLE 3

Treatment of an Alloy

An AZ91D magnesium alloy was treated by means of the composition obtained in example 1. Alloy AZ91D is a magnesium alloy containing 9% aluminum and 1% zinc.

A specimen of AZ91D alloy was immersed in a composition obtained according to the operating method described above, at room temperature, the composition being continuously stirred. About every 40 minutes, the specimen was removed from the composition and then immersed as quickly as possible. After 3 hours, the specimen was extracted from the composition, and sealed for about 3 to 5 hours by resting in the air and reimmersion in the treatment solution every 20 minutes, then rinsed in water, dried in air and annealed at 150° C. for a few hours in oxygen.

Characterization of the Treated Specimen

The treated specimen was subjected to XPS analysis. The results showed the presence of $ZrO_2$ (≈40 at %), $CeO_2$ (≈21 at %), $MgF_2$ (≈10 at %), MgO (≈16 at %), $Mg(OH)_2$ (≈8 at %), $Nb_2O_5$ and $NbO_xF_y$ (≈5 at %), in the coating layer formed on the surface of the specimen.

The treated specimen and an untreated alloy were subjected to voltammetry and to impedance spectroscopy in a corrosive medium consisting of a 0.5 mol/l $Na_2SO_4$ solution under polarization. The curves representing the variation in current as a function of potential show a shift in the corrosion potential toward more positive values and a substantial reduction in the corrosion and anodic dissolution currents for the treated alloy compared with the untreated alloy.

The invention claimed is:

1. A composition for the treatment of a magnesium alloy, comprising an aqueous acid solution containing niobium pentoxide, a water-soluble cerium salt and a zirconium salt.

2. The composition as claimed in claim 1, which further contains hydrofluoric acid.

3. The composition as claimed in claim 1, comprising an aqueous solution whose pH is between 3.2 and 4, which composition contains:
from 0.02 to 0.05 mol/l of niobium pentoxide;
from 1 to 2.5 ml/l of hydrofluoric acid;
from greater than 0 up to 0.1 mol/l of a zirconium salt; and
from 0.03 to 0.1 mol/l of a water-soluble cerium salt.

4. The composition as claimed in claim 1, wherein the cerium salt is cerium nitrate Ce $(NO_3)_3.6H_2O$.

5. The composition as claimed in claim 1, wherein the zirconium salt is zirconyl nitrate ZrO $(NO_3)_2.xH_2O$.

6. The composition as claimed in claim 1, wherein the cerium salt/zirconium salt molar ratio is equal to 1.

7. The composition as claimed in claim 1, which further contains a corrosion moderator selected from the group consisting of Al $(OH)_3$ and $AlF_3$.

8. The composition as claimed in claim 1, wherein the solution is supersaturated with niobium pentoxide.

9. The composition as claimed in claim 1, which further contains a compound for adjusting the pH.

10. The composition as claimed in claim 9, wherein the compound for adjusting the pH is ammonium fluoride.

11. The composition as claimed in claim 1, which further contains ammonium fluoride and a corrosion moderator selected from the group consisting of $Al(OH)_3$ and $AlF_3$.

12. A process for preparing a composition as claimed in claim 1, for the treatment of a magnesium alloy, said process comprising introducing, with stirring, the water-soluble cerium salt and the zirconium salt into an aqueous $Nb_2O_5$ solution containing HF, the mixture being stirred and then left to rest until dissolution of the cerium salt and the zirconium salt.

13. The process as claimed in claim 10, wherein at least one of the components selected from the group consisting of a compound for adjusting the pH and a corrosion moderator are introduced into the $Nb_2O_5$ solution, in addition to the cerium salt and the zirconium.

14. A process for preparing a composition as claimed in claim 2, for the treatment of a magnesium alloy, wherein, in a first step, the following primary solutions are prepared:
an aqueous $Nb_2O_5$ solution containing from 0.15 to 0.45 mol/l of niobium pentoxide and from 15 to 25 ml/l of 48% HF;
an aqueous solution containing from 0.15 to 0.75 mol/l of cerium nitrate and greater than 0 up to 0.75 mol/l of zirconyl nitrate $ZrO(NO_3)_2.xH_2O$; and
during a second step, the primary solutions (in the order in which they are mentioned), and crystallized 97% $NH_4F$ are introduced into water.

15. A process for preparing the composition as claimed in claim 10, for the treatment of a magnesium alloy, said process comprising introducing with stirring, the water-soluble cerium salt, ammonium fluoride, and a zirconium salt into an aqueous $Nb_2O_5$ solution which contains HF, the mixture thus obtained being stirred and then left to rest until dissolution of the cerium salt, the ammonium fluoride and the zirconium salt.

16. A process for preparing the composition as claimed in claim 7, for the treatment of a magnesium alloy, said process comprising introducing with stirring, the water-soluble cerium salt, the corrosion moderator, ammonium fluoride, and the zirconium salt into an aqueous $Nb_2O_5$ solution which contains HF, the mixture thus obtained being stirred and then left to rest until dissolution of the cerium salt, the corrosion moderator, ammonium fluoride and the zirconium salt.

17. A process for preparing a composition as claimed in claim 11 for the treatment of a magnesium alloy, wherein, in a first step, the following primary solutions are prepared:
an aqueous $Nb_2O_5$ solution containing from 0.15 to 0.45 mol/l of niobium pentoxide and from 15 to 25 ml/l of 48% HF;
an aqueous solution containing from 0.15 to 0.75 mol/l of cerium nitrate and from greater than 0 to 0.75 mol/l of zirconyl nitrate $ZrO(NO_3)_2 \cdot xH_2O$; and
a solution, containing 0.15 mol/l of $Al(OH)_3$ and 0.09 mol/l of $AlF_3 \cdot 3H_2O$;
and during a second step, the primary solutions (in the order in which they are mentioned), and crystallized 97% $NH_4F$ are introduced into water in order to obtain said composition.

18. A process for preparing the composition as claimed in claim 11, for the treatment of a magnesium alloy, said process comprising introducing with stirring, the water-soluble cerium salt, the corrosion moderator, ammonium fluoride, and the zirconium salt into an aqueous $Nb_2O_5$ solution which contains HF, the mixture thus obtained being stirred and then left to rest until dissolution of the cerium salt, the corrosion moderator, ammonium fluoride, and the zirconium salt.

19. A process for treating a magnesium alloy workpiece, comprising immersing said workpiece in a treatment composition, said treatment composition comprising an aqueous acid solution containing niobium pentoxide and a water-soluble cerium salt.

20. The process as claimed in claim 19, wherein the magnesium alloy workpiece undergoes a preliminary treatment for the purpose of cleaning a surface.

21. The process as claimed in claim 19, wherein the treatment composition is stirred and maintained at a temperature of between 20 and 30° C. while the workpiece to be treated is immersed.

22. The process as claimed in claim 19, wherein the workpiece to be treated undergoes an additional treatment comprising the step of immersing the workpiece in the treatment composition followed by a step of leaving the workpiece in air, said additional treatment being repeated several times, followed by annealing, the duration of the immersion steps being a few seconds and the duration of the steps in air being 20 to 45 minutes.

23. The process as claimed in claim 22, wherein the annealing is carried out at a temperature between 75 and 175° C. in oxygen.

24. The process according to claim 19, wherein the treatment composition further contains a zirconium salt.

25. The process as claimed in claim 24, wherein the magnesium alloy workpiece undergoes a preliminary treatment for the purpose of cleaning the surface.

26. The process as claimed in claim 24, wherein the treatment composition is stirred and maintained at a temperature of between 20 and 30° C. while the workpiece to be treated is immersed.

27. The process as claimed in claim 24, wherein the workpiece to be treated undergoes an additional treatment comprising the step of immersing the workpiece in the treatment composition followed by a step of holding the workpiece in air, said additional treatment being repeated several times, followed by annealing, the duration of the immersion steps being a few seconds and the duration of the steps in air being 20 to 45 minutes.

28. The process as claimed in claim 27, wherein the annealing is carried out at a temperature between 75 and 175° C. in oxygen.

29. The process according to claim 19, wherein the treatment composition further contains at least one component selected from the group consisting of a zirconium salt, a compound for adjusting the pH and a corrosion moderator.

30. The process as claimed in claim 29, wherein the magnesium alloy workpiece undergoes a preliminary treatment for the purpose of cleaning the surface.

31. The process as claimed in claim 29, wherein the treatment composition is stirred and maintained at a temperature of between 20 and 30° C. while the workpiece to be treated is immersed.

32. The process as claimed in claim 29, wherein the workpiece to be treated undergoes an additional treatment comprising the step of immersing the working piece in the treatment composition followed by a step of leaving the workpiece in air, said additional treatment being repeated several times, followed by annealing, the duration of the immersion steps being a few seconds and the duration of the resting steps in air being 20 to 45 minutes.

33. The process as claimed in claim 32, wherein the annealing is carried out at a temperature between 75 and 175° C. in oxygen.

34. A protective coating obtained on the surface of a magnesium alloy workpiece by the process as claimed in claim 19, said coating being uniform and dense and comprising a mixture of compounds including niobium oxide, cerium oxide, and magnesium oxide.

35. A protective coating obtained on the surface of a magnesium alloy workpiece by the process as claimed in claim 24, said coating being uniform and dense and comprising a mixture of compounds including niobium oxide, cerium oxide, magnesium oxide, and zirconium oxide, the magnesium oxide being formed by reaction between said treatment composition and the magnesium present in said alloy.

36. The protective coating according to claim 35, wherein the mixture of compounds further includes at least one compound selected from the group consisting of aluminum oxide, magnesium fluoride and a niobyl fluoride.

* * * * *

UNITED STATES PATENT AND TRADEMARK OFFICE
CERTIFICATE OF CORRECTION

| | | |
|---|---|---|
| PATENT NO. | : 7,156,905 B2 | Page 1 of 1 |
| APPLICATION NO. | : 10/478861 | |
| DATED | : January 2, 2007 | |
| INVENTOR(S) | : Helene Ardelean et al. | |

It is certified that error appears in the above-identified patent and that said Letters Patent is hereby corrected as shown below:

Please change Claim 13, line 1, from "claim 10" to --claim 12--.

Please change Claim 17, line 2, from "claim 11" to --claim 2--.

Signed and Sealed this

Seventh Day of August, 2007

JON W. DUDAS
*Director of the United States Patent and Trademark Office*